United States Patent
Helén et al.

(10) Patent No.: US 10,924,407 B2
(45) Date of Patent: Feb. 16, 2021

(54) METHOD AND DETECTOR FOR RESOLVING UNICAST FLOODING

(71) Applicant: Telefonaktiebolaget LM Ericsson (publ), Stockholm (SE)

(72) Inventors: Per Helén, Saltsjö-Boo (SE); Clarence Ammervik, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/481,810

(22) PCT Filed: Jan. 31, 2017

(86) PCT No.: PCT/SE2017/050080
§ 371 (c)(1),
(2) Date: Jul. 29, 2019

(87) PCT Pub. No.: WO2018/143842
PCT Pub. Date: Aug. 9, 2018

(65) Prior Publication Data
US 2019/0394130 A1 Dec. 26, 2019

(51) Int. Cl.
*H04L 12/801* (2013.01)
*H04L 12/721* (2013.01)

(52) U.S. Cl.
CPC ............ *H04L 47/12* (2013.01); *H04L 45/32* (2013.01); *H04L 45/66* (2013.01)

(58) Field of Classification Search
CPC .......... H04L 47/12; H04L 45/32; H04L 45/66
See application file for complete search history.

(56) References Cited

U.S. PATENT DOCUMENTS

2011/0271009 A1* 11/2011 Doshi ................ H04L 63/1466
709/242
2013/0044754 A1* 2/2013 Zhu ................... H04L 29/12028
370/392

(Continued)

FOREIGN PATENT DOCUMENTS

EP         2566129 A1    3/2013
WO    2018143842 A1    8/2018

OTHER PUBLICATIONS

Unicast Flooding in Switched Campus Networks—Cisco, Sep. 27, 2016, pp. 1-4, http://www.cisco.com/c/en/us/support/docs/switches/catalyst6000seriesswitches/23563143.html.

(Continued)

*Primary Examiner* — Andrew Lai
*Assistant Examiner* — Harry H Kim
(74) *Attorney, Agent, or Firm* — Boisbrun Hofman, PLLC

(57) ABSTRACT

It is disclosed a method and a detector capable of resolving unicast flooding in a layer 2 broadcast domain. The method is performed in a detector having a medium access control (MAC) address. The detector receives a first flooded packet having a destination MAC address differing from the detector's MAC address. The detector sends a message to a node in the layer 2 broadcast domain, wherein the type of the node is determined based on the destination MAC address of the first flooded packet and/or based on whether a destination Internet protocol (IP) address of the first flooded packet is an address within the layer 2 broadcast domain. It is advantageous that the message is adapted to trigger the node to announce its MAC address within the layer 2 broadcast domain, causing the unicast flooding to be resolved, by which consumption of available bandwidth is reduced.

18 Claims, 6 Drawing Sheets

(56) References Cited

U.S. PATENT DOCUMENTS

| | | | | |
|---|---|---|---|---|
| 2013/0195115 A1* | 8/2013 | Timm | .................. | H04L 45/586 370/401 |
| 2014/0029618 A1* | 1/2014 | Janardhanan | ........... | H04L 45/24 370/392 |
| 2015/0117179 A1* | 4/2015 | Sato | ........................ | H04L 45/00 370/219 |

OTHER PUBLICATIONS

PCT/SE2017/050080 International Search Report and Written Opinion dated Mar. 23, 2017, 12 pages.

* cited by examiner

METHOD AND DETECTOR FOR RESOLVING UNICAST FLOODING

CROSS-REFERENCE TO RELATED APPLICATION

This application is the National Stage of, and therefore claims the benefit of, International Application No. PCT/SE2017/050080 filed on 31 Jan. 2017, entitled "Method and Detector For Resolving Unicast Flooding." The above-referenced application is commonly assigned with this National Stage application and is incorporated herein by reference in its entirety.

TECHNICAL FIELD

This disclosure relates to resolving unicast flooding. More particularly, it relates to a method, a detector, a computer program and a computer program product for resolving unicast flooding in a layer 2 broadcast domain.

BACKGROUND

Flooding in a computer network is a forwarding algorithm by which each packet received by a node on a link is sent to all links except for the one on which the packet was received.

Flooding can be intentional but may also be unintentional, for instance in unicast flooding.

When present in a layer 2 broadcast domain, flooding of frames consumes bandwidth resources.

Unicast flooding occurs when a node has no information on which link to reach a certain destination. Frames being flooded are broadcasted on all links of the node, except for the one on which the frames were received, due to that the link on which to forward the frames to the destination address is unknown to the node.

Unicast flooding may last for several minutes, during which available bandwidth is consumed.

Flooding occurring when a destination medium access control (MAC) address of a node has not been used as source MAC address in a message, which means that when a message is to be forwarded to the destination MAC address, the switch to forward the packet does not know on which port to send the message. This flooding is intentional and is solved.

In asymmetric routing, in which frames in opposite directions are routed differently, unicast flooding may occur since certain destination MAC addresses are unknown.

There is hence a demand for a technique circumventing or at least diminishing issues of consumption of available bandwidth in a layer 2 broadcast domain in unicast flooding.

SUMMARY

It is an object of exemplary embodiments herein to address at least some of the issues outlined above and to resolve unicast flooding in a layer 2 broadcast domain. This object and others are achieved by a detector capable of resolving unicast flooding and a method for resolving unicast flooding in a layer 2 broadcast domain, according to the appended independent claims, and by the exemplary embodiments according to the dependent claims.

According to an aspect, the exemplary embodiments provide a method for resolving unicast flooding in a layer 2 broadcast domain. The method comprises receiving a first flooded packet having a destination medium access control address that is different from the detector's medium access control address. The method also comprises sending a message to a node in the layer 2 broadcast domain. The type of the node, which specifies the message to send, is determined based on whether the destination medium access control address of the first flooded packet is a virtual router redundancy protocol medium access control address and/or whether the destination Internet protocol address of the first flooded packet is an address within the layer 2 broadcast domain. The message is adapted to trigger the node to announce its medium access control address within the layer 2 broadcast domain, causing the unicast flooding to be resolved.

According to another aspect, the exemplary embodiments provide a detector capable of resolving, the detector having a medium access control address, and being adapted to be uniquely connected to a port of a switch within the layer 2 broadcast domain. The detector comprises an interface and a processing circuit, where the interface is adapted to receive a first flooded packet having a destination MAC address. The interface is also adapted to send a message to a node in the layer 2 broadcast domain. The message is adapted to trigger the node to announce its MAC address within the layer 2 broadcast domain, by which the unicast flooding is to be resolved. The processing circuit is adapted to, when the destination MAC address of the first flooded packet is different from the medium access control address of the detector, determine the type of the node based on the whether the destination medium access control address of the first flooded packet is a virtual router redundancy protocol medium access control address and/or whether the destination Internet protocol address of the first flooded packet is an address within the layer 2 broadcast domain.

According to further aspects, the object is also achieved by a computer program and a computer program product comprising a computer-readable storage medium whereon the computer program is stored.

Unicast flooding as used herein, in contrast to flooding, is intended to denote a behaviour of a layer 2 switch when treating a unicast packet, i.e. destined to one address, as a broadcast packet. A packet reaching such a layer 2 switch, where the packet is destined to one node, i.e. unicast is then flooded, or transmitted, on all links connected to the layer 2 switch.

A flooded packet is to be construed as the packet that is sent from a layer 2 switch on a port thereof due to unicast flooding.

Detection of unicast flooding occurs when receiving, a packet being destined to the unicast destination MAC address, by a node that is not associated with the unicast destination MAC address of the packet, where the node is uniquely connected to a port on a layer 2 switch.

An unused IP address is intended to denote an IP address within the layer 2 broadcast domain, which IP address has not been used for communication, either it has not been assigned to any node or it is a special address for which when an address resolution protocol (ARP)/neighbouring discovery protocol (NDP) request is sent for the address, no reply to the request is produced.

Examples and embodiments as described have advantages and preferable features. For instance, it is advantageous that unicast flooding can be easily and quickly resolved by using a method and or a detector, according to embodiments of the present disclosure, thereby saving available bandwidth.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

There is hence a demand for an improved technique circumventing or at least diminishing issues with consumption of available bandwidth.

Figure 1A:
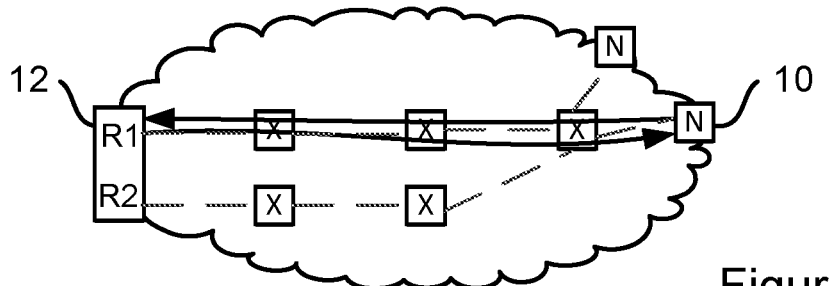
FIGS. 1A-C schematically illustrate a layer 2 broadcast domain, in which unicast flooding of packets occurs, the unicast flooding packets being destined to a VRRP MAC address.
Figure 1B:
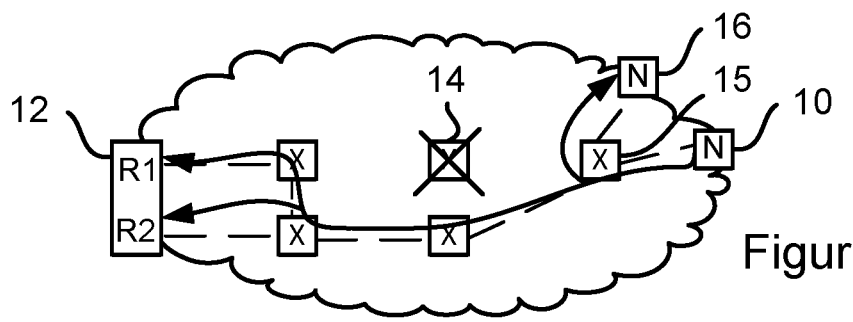
Figure 1C:
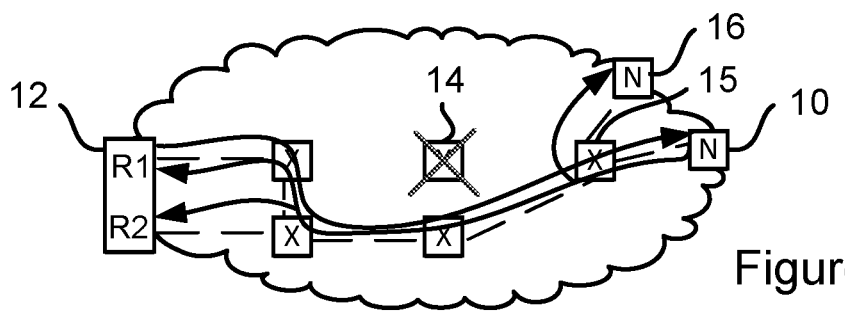

FIGS. 1A-1C schematically illustrate a layer 2 broadcast domain, in which unicast flooding of packets occurs.

Dotted lines in FIGS. 1A-1C denote links that are open to forward packets on. Links can be closed due to error or to prevent loops in the layer 2 broadcast domain.

FIG. 1A presents a layer 2 broadcast domain in which packets are sent between node 10 and node 12. FIG. 1A also comprises a number of switches, where each switch has a medium access control (MAC) table, or forwarding database, comprising information on which port to forward a packet directed to a MAC address in the layer 2 broadcast domain. Each switch stores the source address of a received packet and thereby learns on which port to send a packet to a specific MAC address. A MAC learning process hence takes place, in each switch upon receipt of a packet to forward. The forwarding database is thus built up during this MAC learning process.

Further, In FIG. 1A, node 12 is presented as a virtual router redundancy protocol (VRRP) router having two interworking routers, that is Router R1 and router R2, of which router R1 is the master, and router R2 is a backup router for the master router R1. During normal traffic from the VRRP router, the VRRP router sends packets to node 10 by using the MAC address of the master router R1 as source address. At regular intervals the VRRP router sends a broadcast advertisement, by which the VRRP router sends packets using a VRRP MAC address as source address. As mentioned earlier, each switch along a path of packets learns from the source address of the packet, on which link to forward a packet to reach the source address, in a response. Now, when the VRRP router uses the VRRP MAC address as source address each switch along the path of the packets directed to node 10, hence learns how to forward packets to the VRRP MAC address. Thus, when node 10 sends packets to the VRRP router, the VRRP MAC address is used as destination address, whereby each switch along the path has information on which port to forward the packets, towards a VRRP MAC address. It is noted that FIG. 1A illustrates traffic being forwarded between node 12, i.e. the VRRP router and node 10, after the VRRP router has sent a broadcast advertisement. The switches have therefore already learnt the VRRP MAC address.

FIG. 1B presents the layer 2 broadcast domain of FIG. 1A in which switch 14 is down or disconnected. When node 10 intends to send packets to the VRRP router 12, the node 10 uses a VRRP MAC address as the destination address of the packets. However, since switch 14 is down, switch 15 detects that it can no longer forward packets on the link to switch 14, and hence loses the information on which port to forward packets when destined to the VRRP MAC address. Since switch 15 has no information on which port to forward packets to the VRRP MAC address, switch 15 will forward the packets on all its connected ports, except for the port on which the packets, to be forwarded, were received by switch 15. The packets are hence flooded. Packets are consequently flooded to node 16, and further along to all connected node or connectors. The packets hence also reach individual router R1 and R2.

FIG. 10 presents the layer 2 broadcast domain of FIG. 1B, where packets from node 10 and destined to a VRRP MAC address are flooded in the layer 2 broadcast domain, and hence reach all connected nodes and items. Router R1 being the master router of VRRP router 12, now responses to the packets received and sends a packet towards node 10. Since router R1 now sends the packet, the source address that is used will be the source address of router R1, which is not the same as the VRRP MAC address. The source address being used for the packet from the router R1 to node 10 will be router R1 MAC address. Node 10 will thus receive a packet having router R1 MAC address as source address. The switches along the path between router R1 and node 10 will however not learn on which link to forward packets to the VRRP MAC address, since this MAC address was not used when sending packets towards node 10. The switches along the path will thus not be able to resolve the flooding, for which reason unicast flooding will continue until a regular VRRP advertisement is sent, hence consuming available bandwidth.

With reference to the following Figures, it will be described how to resolve unicast flooding of FIG. 10, i.e. when occurring in a layer 2 broadcast domain.

FIGS. 1D-1G schematically illustrate a layer 2 broadcast domain, in which unicast flooding of packets is being resolved, according to some embodiments of the present disclosure.

Similar to FIGS. 1A-1C, dotted lines in FIGS. 1D-1G denote links that are open to forward packets on. Links can be closed due to error or to prevent loops in the layer 2 broadcast domain.

It is noted that the FIGS. 1D-G illustrate embodiments wherein the node 12 is a VRRP router. In other embodiments of the present disclosure, node 12 may be a host or a router, other than a VRRP router. These other embodiments will also be described below, however in less detail, as compared to the VRRP router embodiments.

Figure 1D:
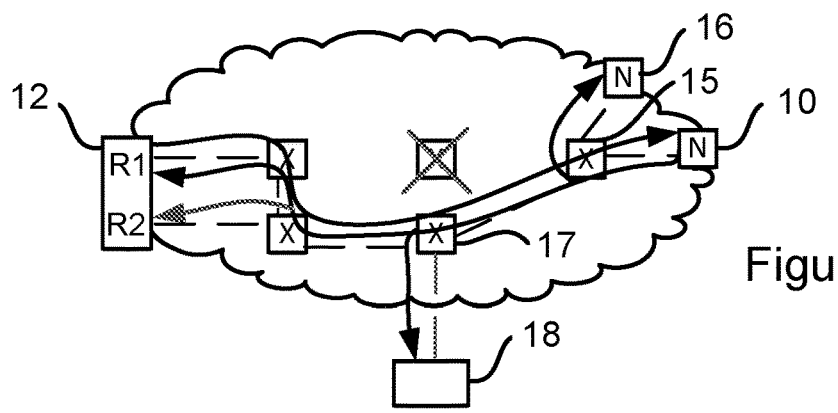
FIGS. 1D-G schematically illustrate a layer 2 broadcast domain, in which unicast flooding of packets is resolved, the unicast flooding packets being destined to a VRRP MAC address, according to embodiments of the present disclosure.

It will be described inventive actions how to resolve unicast flooding in a layer 2 broadcast domain. FIG. 1D illustrates a detector 18 that is connected to switch 17 along the path from node 10 and routers R1 and R2. Since the detector is connected to the layer 2 broadcast domain, it will receive packets being flooded on the layer 2 broadcast domain. Thus, the packets being flooded having a VRRP MAC address as destination address will hence also be received by the detector 18.

As mentioned above, the flooded packets have a VRRP MAC address as destination address, which VRRP MAC address is not the detector's own MAC address.

The detector may have a MAC address on its own, but does not need to. When several detectors are present in the layer 2 broadcast domain all detectors can use the same MAC address. The MAC address being used by the one or more detectors shall however not be used by any other node in the layer 2 broadcast domain.

Since the packets received are not destined to the detector 18, the detector 18 concludes that the packets received are flooded.

Figure 1E:
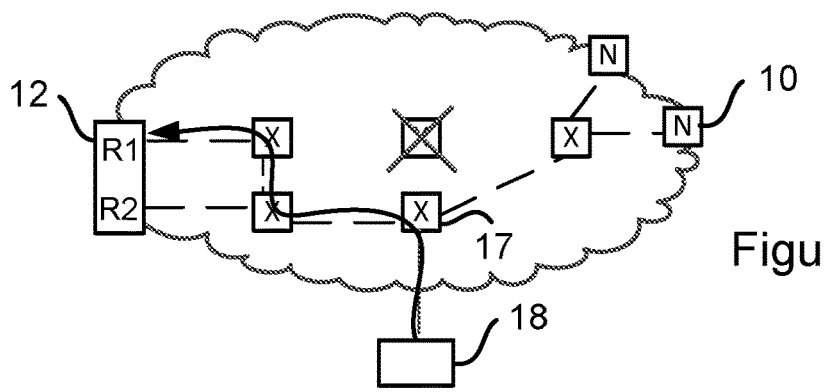

FIG. 1E also schematically illustrates the layer 2 broadcast domain, in which unicast flooding of packets is being resolved, according to the described embodiments of the present disclosure.

The detector 18 has now determined that the received packets were not intended to the detector, but rather to a VRRP MAC address. More specifically, it is noted that that destination MAC address of the packet is a MAC address in the range 00-00-5E-00-01/02-xx, which MAC address is a VRRP MAC address. In addition, the detector also notes that the packets are flooded, since they would else be directly forwarded to the destination in the layer 2 broadcast domain, without being forwarded to the detector 18.

It is to be understood that packets being flooded can be due to that a destination address that is used in packets is unknown in one or more switches in the layer 2 broadcast domain, or rather that it is unknown on which port to forward such packets in order for them to reach the destination address.

According to some embodiments, as an inventive remedy to the flooding, the detector 18 designs a message that is intended to trigger router R1 to announce a VRRP MAC address on the layer 2 broadcast domain. As illustrated in FIG. 1D, the detector 18 sends a message by using the VRRP MAC address as destination address. This message may comprise a VRRP advertisement with priority 0 (zero), which forces the VRRP router to send a VRRP advertisement broadcast message.

Figure 1F:
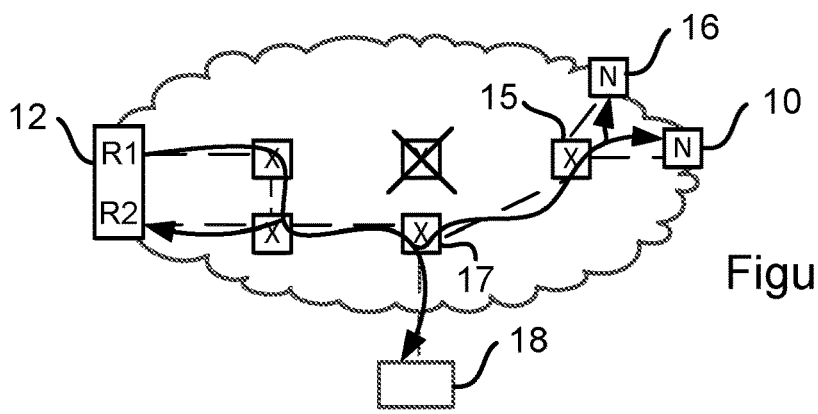

FIG. 1F similarly schematically illustrates the layer 2 broadcast domain, in which unicast flooding is being resolved. A message is thus sent from the detector 18, wherein the message is intended to trigger the receiver to announce its MAC address on the layer 2 broadcast domain.

The message having the VRRP MAC address as destination address, is received by the router R1, being the master of routers R1 and R2.

Since the message as received was designed to trigger announcement of a VRRP MAC address, router R1 of the VRRP router broadcasts an announcement message on the layer 2 broadcast domain, to announce the VRRP MAC address. This broadcast message is sent to all nodes and connectors which are connected to the layer 2 broadcast domain. The message thus reaches all switches, including switches 15 and 17, as well as router R2, detector 18, and nodes 10 and 16, as presented in FIG. 1F.

Figure 1G:
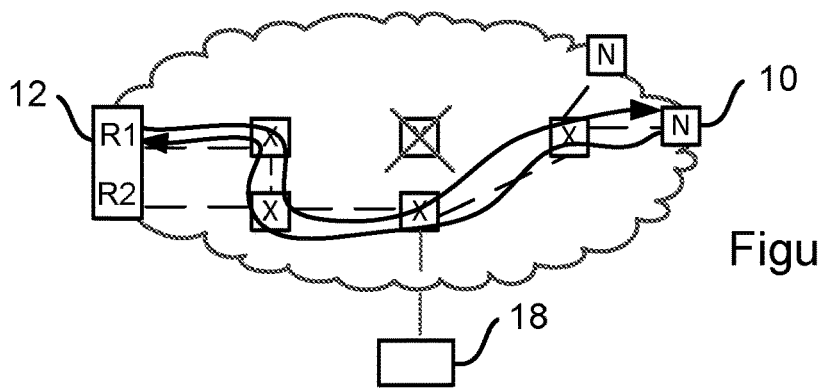

FIG. 1G similarly schematically illustrates the layer 2 broadcast domain, in which unicast flooding is being resolved. All connectors connected to the layer 2 broadcast domain thus received the announcement from router R1 of the VRRP router 12. Since the announcement using a VRRP MAC address as source address also passed every switch in the layer 2 broadcast domain, information was spread throughout the layer 2 broadcast domain on which link to direct a packet or message to the VRRP router. Having this information, all switches in the layer 2 broadcast domain have information on how to forward a message or packet to the VRRP router. Unicast flooding is hence resolved.

Figure 2:
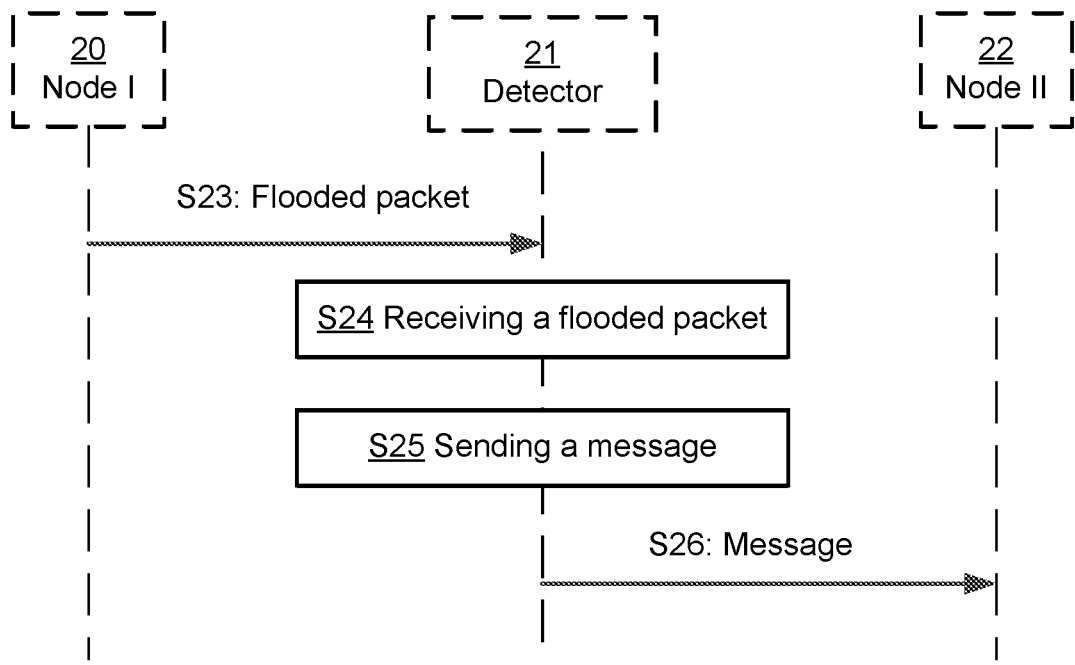
FIG. 2 illustrates a general signalling diagram within the layer 2 broadcast domain, according to embodiments of the present disclosure.

FIG. 2 illustrates a general signalling diagram within the layer 2 broadcast domain, according to embodiments of the present disclosure. Signalling is performed between node I, 20, detector 21 and node II, 22. The detector has a MAC address and is located within the layer 2 broadcast domain. The detector is uniquely connected to a port of a switch within the layer 2 broadcast domain. The MAC address may be shared by several detectors in the layer 2 broadcast domain.

In S23, a flooded packet is sent from the node I, 20.

In S24, the detector receives the flooded packet that has a destination MAC address that is different from the MAC address of the detector.

In S25, the detector 25 sends a message intended to trigger node II, 22 to announce its MAC address within the layer 2 broadcast domain. The detector 25 determines the type of the node based on whether the destination MAC address of the flooded packet is a VRRP MAC address and/or whether the destination IP address of the first flooded packet is an address within the layer 2 broadcast domain.

In S26, the node II receives the message intended to trigger node II, 22 to announce its MAC address. It is the announcement of its MAC address that causes the unicast flooding to be resolved.

Figure 3:
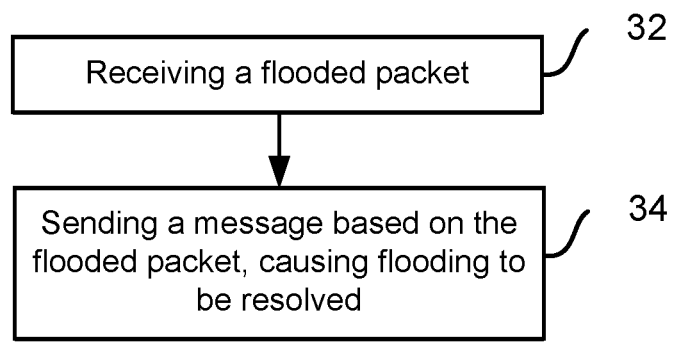
FIGS. 3 and 4 illustrate flow charts of a method of actions in a detector, according to embodiments of the present disclosure.

FIG. 3 illustrates a flow chart of actions in a method for resolving unicast flooding in a layer 2 broadcast domain. The method is performed in a detector having a MAC address. The detector is uniquely connected to a port of a switch within the layer 2 broadcast domain.

The flow chart comprises action 32 of receiving S24, 42, 502 a first flooded packet that has a destination MAC address that is different from the detector's MAC address.

The flow chart also comprises action 34 of sending S25, 44, 512; 520; 528 a message to a node in the layer 2 broadcast domain. The type of the node is determined based on whether the destination MAC address of the first flooded packet is a VRRP MAC address and/or whether the destination IP address of the first flooded packet is an address within the layer 2 broadcast domain. The message is adapted to trigger the node to announce its MAC address within the layer 2 broadcast domain, causing the unicast flooding to be resolved. Action 34 of sending the message may thus be considered as sending the message based on the flooded packet, causing unicast flooding to be resolved.

In action 34, when the destination MAC address of the first flooded packet is a VRRP MAC address, the sending of the message to a node may comprise sending 528 the message to the VRRP MAC address.

In action 34, when the destination MAC address of the first flooded packet is other than a VRRP MAC address, and when the destination IP address is an address within the layer 2 broadcast domain, the sending of the message to the node may comprise sending 512 the message with an unused IP address as source address, which message is to be responded to by the node.

In action 34, when the destination MAC address of the first flooded packet is other than a VRRP MAC address, and when the destination IP address is an address outside the layer 2 broadcast domain, the sending of the message to the node may comprise sending 520 an IP packet towards an IP address that is unused in the layer 2 broadcast domain, which message is to be forwarded within the broadcast domain.

Figure 4:
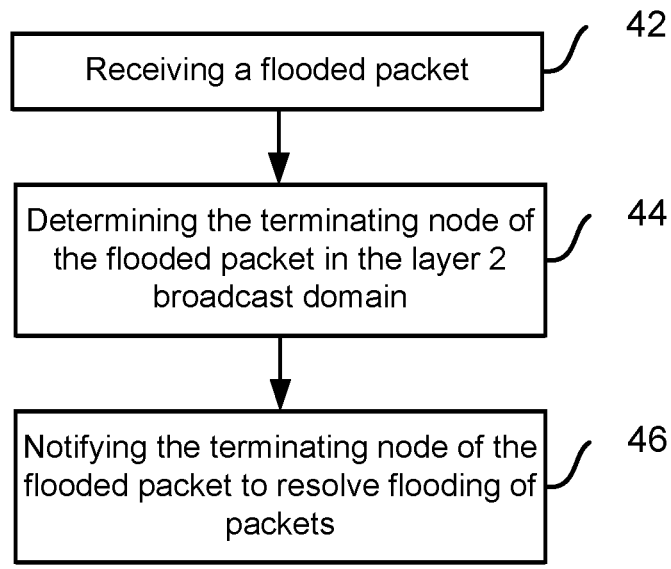

FIG. 4 illustrates a flow chart of actions according to an embodiment of the method for resolving unicast flooding in a layer 2 broadcast domain, as illustrated in FIG. 3. The method is performed in a detector having a MAC address. The detector is uniquely connected to a port of a switch within the layer 2 broadcast domain. The method comprises the following actions:

Action 42 of receiving a first flooded packet that has a destination MAC address that is different from the detector's MAC address corresponds to action 32 as presented in FIG. 3.

Action 44 comprises determining the type of the layer 2 terminating node of the flooded packet in the layer 2 broadcast domain. Determining the type of the layer 2 terminating node may be is based on the destination address of the flooded packet. The type of the layer 2 terminating node of the flooded packet is a VRRP router if the destination MAC address of the first flooded packet is a VRRP MAC address.

When the destination MAC address of the first flooded packet is not a VRRP MAC address, and when the destination IP address of the first flooded packet is an address within the layer 2 broadcast domain, the layer 2 terminating node is a host within the layer 2 broadcast domain.

When the destination MAC address of the first flooded packet is not a VRRP MAC address, and when the destination IP address of the first flooded packet is not an address within the layer 2 broadcast domain, the layer 2 terminating node is a router within the layer 2 broadcast domain.

Action 46 comprises notifying the layer 2 terminating node of the flooded packet to resolve the unicast flooding of packets. The layer 2 terminating node may thus be notified by having the detector sending a message or a packet triggering the terminating to announce its MAC address on the layer 2 broadcast domain.

It is noted that actions 42 and 44 may be considered to correspond to action 34 as presented in FIG. 3.

The present disclosure also comprises a computer program that is configured, when run on a computer, to perform the method for resolving unicast flooding in a layer 2 broadcast domain. The computer uses a MAC address, and is uniquely connected to a port of a switch within the layer 2 broadcast domain.

When run on the computer, the computer program performs receiving S24, 42, 502 of a first flooded packet that has a destination MAC address that is different from the computer's MAC address.

When run on the computer, the computer program also performs sending S25, 44, 512; 520; 528 of a message to a node in the layer 2 broadcast domain. The type of the node is determined based on whether the destination MAC address of the first flooded packet is a VRRP MAC address and/or whether the destination IP address of the first flooded packet is an address within the layer 2 broadcast domain. The message is adapted to trigger the node to announce its MAC address within the layer 2 broadcast domain, causing the unicast flooding to be resolved. Sending of the message may thus be considered as sending the message based on the flooded packet, causing unicast flooding to be resolved.

The present disclosure also comprises a computer program product that comprises a computer-readable storage medium and the computer program as above, wherein the computer program is stored on the computer readable storage medium.

Figure 5A:
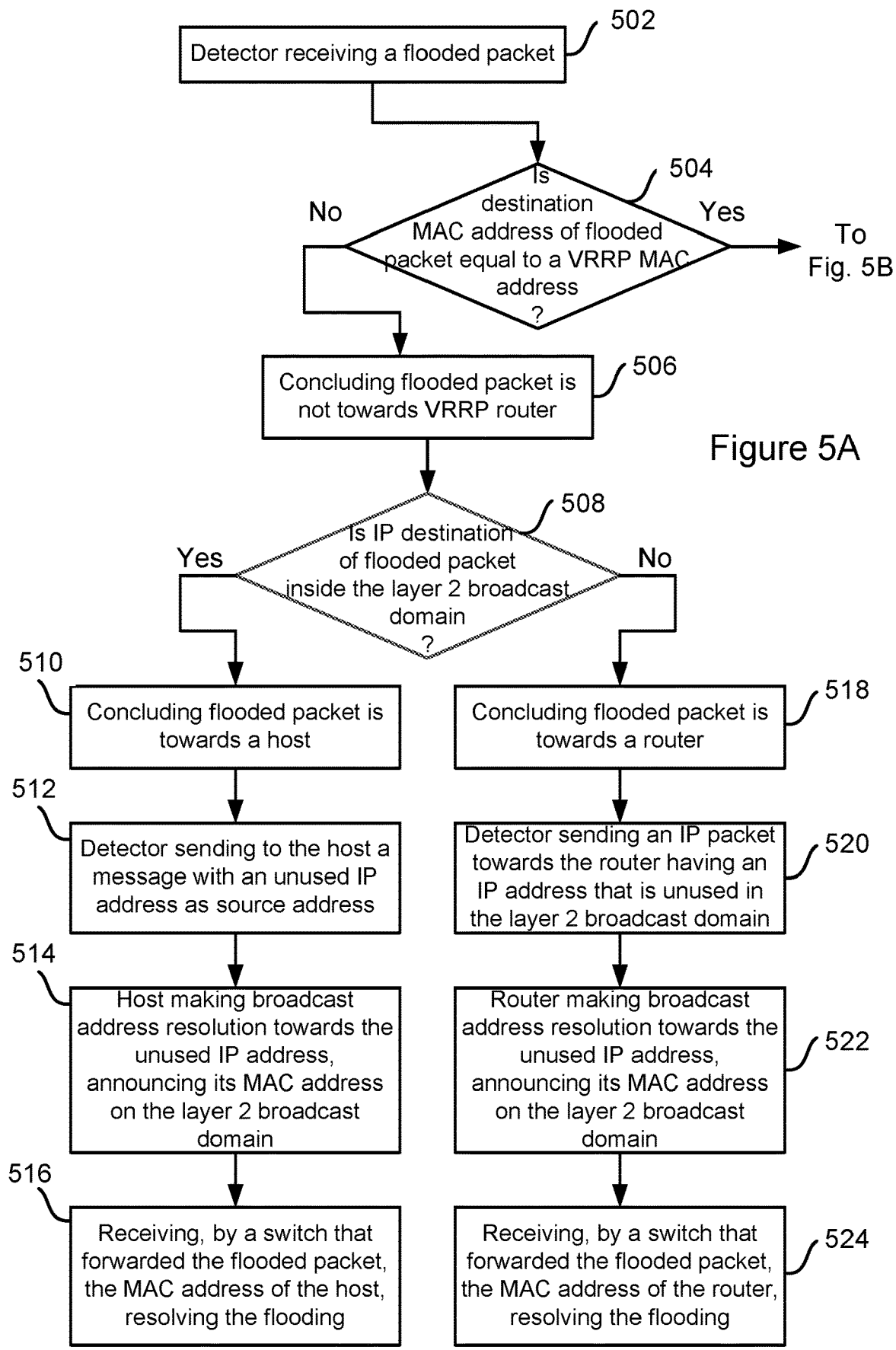
FIGS. 5A and 5B illustrate a flow chart of actions related to the embodiments of the present disclosure.
Figure 5B:
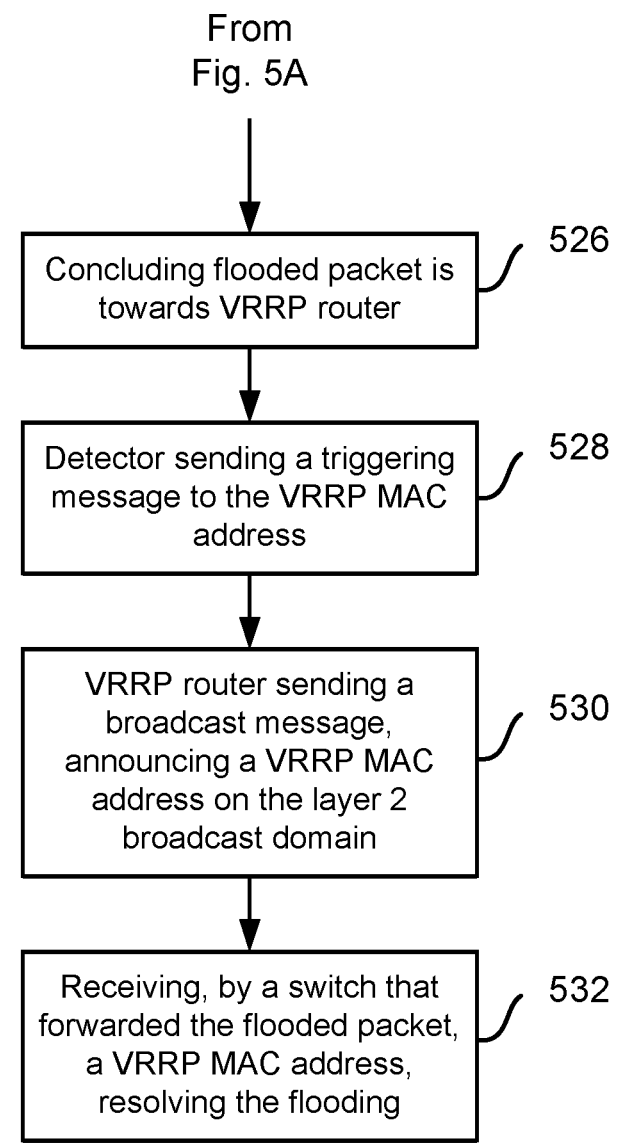

FIGS. 5A and 5B illustrate a flow chart of actions related to the embodiments for resolving unicast flooding in a layer 2 broadcast domain. As will be described below, some of the actions in this flow chart will be performed by a detector that is adapted to use a MAC address, and to be uniquely connected to a port of a switch within the layer 2 broadcast domain. In FIG. 5A the actions comprise:

Action 502: The detector receives a flooded packet. The detector concludes that the packet is flooded since the destination MAC address of the flooded packet is different from the MAC address of the detector.

Action 504: The detector determines if the destination MAC address of the flooded packet equals to a MAC address of a VRRP router.

When the determination is negative and the query is answered by "No", the following action is action 506 of concluding that the flooded packet is not flooded towards the VRRP router.

Action 508: The detector here determines if the destination address of the flooded packet is within the layer 2 broadcast domain.

When the determination is positive and the query is answered by "Yes", the following action is action 510 of concluding that the flooded packet is flooded towards a host within the layer 2 broadcast domain.

Action 512: The detector sends to the host a message with an unused IP address as source address. It is noted that receiving a message with an unused IP address as source address is one way of triggering a node to announce its MAC address on a layer 2 broadcast domain.

Action 514: The host makes a broadcast address resolution towards the unused IP address, by which the host announces its own MAC address on the layer 2 broadcast domain.

Action 516: Each switch via which the broadcast resolution passes from the host to the unused IP address, learns the MAC address of the host, i.e. on which link to forward packets to reach the host. The unicast flooding is thus resolved.

Alternatively, when the determination in action 508 is negative and the query is answered by "No", the following action is action 518 of concluding that the flooded packet is flooded towards a router, different from the VRRP router.

Action 520: The detector here sends an IP packet towards an IP address that is unused in the layer 2 broadcast domain.

Action 522: The router receiving the IP packet now announces its MAC address on the layer 2 broadcast domain. For instance, the router makes a broadcast address resolution towards the unused IP address.

Action 524: Each switch via which the broadcast resolution passes from the router to the unused IP address, learns the MAC address of the router, i.e. on which link to forward packets to reach the router. It is noted that unicast flooding is hereby resolved.

In action 504 from above the determination was negative.

When, however, the determination in action 504 is positive and the query is answered by "Yes", reference is made to FIG. 5B. The following action is action 526 of concluding that the flooded packet is flooded towards the VRRP router.

Action 528: The detector here sends a triggering message to a VRRP MAC address, which triggering message triggers the VRRP router to announce its VRRP MAC address.

Action 530: The VRRP router may here send a broadcast message, announcing a VRRP MAC address on the layer 2 broadcast domain.

Finally, action 532: Each switch in the layer 2 broadcast domain will be reached by the broadcast message from the VRRP router, thus also switches which forwarded the flooded packets, thus learning a VRRP MAC address of the VRRP router, i.e. on which link to forward packets to reach the VRRP router. For this reason, the unicast flooding is resolved.

Figure 6:
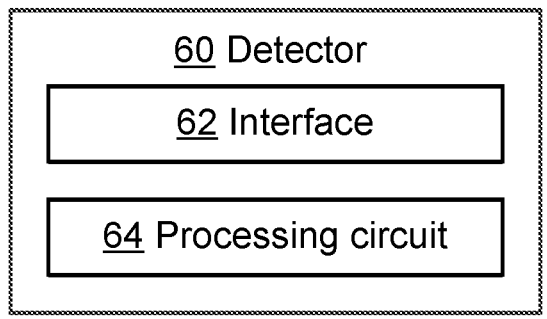
FIGS. 6 and 7 schematically illustrate a detector according to embodiments of the present disclosure.

FIG. 6 schematically illustrates a detector 60 that is capable of resolving unicast flooding in a layer 2 broadcast domain, according to embodiments of the present disclosure. The detector has a MAC address, and is adapted to be uniquely connected to a port of a switch within the layer 2 broadcast domain. The detector 60 comprises an interface 62 and a processing circuit 64.

The interface 62 is adapted to receive a first flooded packet that has a destination MAC address. The interface is also adapted to send a message to a node in the layer 2 broadcast domain, where the message is adapted to trigger the node to announce its MAC address within the layer 2 broadcast domain.

The processing circuit 64 is adapted to, when the destination MAC address of the first flooded packet is different from the MAC address of the detector, determine the type of the node based on the whether the destination MAC address of the first flooded packet is a VRRP MAC address and/or whether the destination IP address of the first flooded packet is an address within the layer 2 broadcast domain.

Triggering the node to announce its MAC address within the layer 2 broadcast domain will cause unicast flooding to be resolved.

The processing circuit 64 of the detector 60 may be adapted to determine the type of the node to be a VRRP router having a VRRP MAC address, when the destination MAC address of the first flooded packet is a VRRP MAC address, and wherein the interface 62 further is adapted to send the message to a VRRP MAC address.

The processing circuit 64 of the detector 60 may be adapted to determine the type of the node, where the node terminates the flooded packet, when the destination MAC address of the first flooded packet is other than a VRRP MAC address, and when the destination IP address is an address within the layer 2 broadcast domain, wherein the interface 62 is further adapted to send the message with the unused IP address as source address, which message is to be responded to by the node. In this case, the node may be a host within the layer 2 broadcast domain.

The processing circuit 64 of the detector 60 may be adapted to determine the type of the node, where the node forwards the flooded packet, when the destination MAC address of the first flooded packet is other than a VRRP MAC address, and when the destination IP address is an address outside the layer 2 broadcast domain, wherein the interface 62 is further adapted to send an IP packet towards the IP address that is unused in the layer 2 broadcast domain, which IP packet is to be forwarded by the node. In this case, the node may be a router within the layer 2 broadcast domain.

The present disclosure also comprises a detector capable of resolving unicast flooding in a layer 2 broadcast domain, according to some embodiments of the present disclosure. The detector has a MAC address, and is adapted to be uniquely connected to a port of a switch within the layer 2 broadcast domain. The detector is adapted to receive a first flooded packet that has a destination MAC address. The detector is also adapted to send a message to a node in the layer 2 broadcast domain, where the message is adapted to trigger the node to announce its MAC address within the layer 2 broadcast domain.

In addition, the detector is adapted to, when the destination MAC address of the first flooded packet is different from the MAC address of the detector, determine the type of the node based on the whether the destination MAC address of the first flooded packet is a VRRP MAC address and/or whether the destination IP address of the first flooded packet is an address within the layer 2 broadcast domain.

Figure 7:
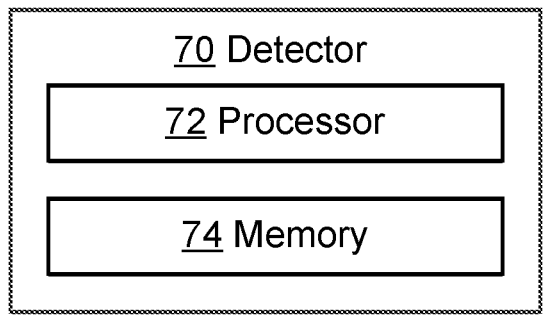

FIG. 7 schematically illustrates yet a further detector 70 that is capable of resolving unicast flooding in a layer 2 broadcast domain, according to some embodiments of the present disclosure. The detector 70 has a MAC address, and is adapted to be uniquely connected to a port of a switch within the layer 2 broadcast domain. The detector 70 comprises a processor 72 and a memory 74, where the memory 74 has instructions executable by the processor 72. The processor 72 is thus, when executing the instructions, configured to receive a first flooded packet that has a destination MAC address that is different from the detector's MAC address. The processor 72 is, when executing the instructions, also configured to send a message to a node in the layer 2 broadcast domain, wherein the type of the node is determined based on whether the destination MAC address of the first flooded packet is a VRRP MAC address and/or whether the destination IP address of the first flooded packet is an address within the layer 2 broadcast domain where the message is adapted to trigger the node to announce its MAC address within the layer 2 broadcast domain, causing the unicast flooding to be resolved.

Examples and embodiments as described herein have a number of advantages and preferable features.

A detector as described above will quickly and easily resolve unicast flooding in a layer 2 broadcast domain, which reduces the consumption of available bandwidth.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

ARP address resolution protocol
IP Internet protocol
MAC medium access control
NDP neighbouring discovery protocol
VRRP virtual router redundancy protocol

The invention claimed is:

1. A method for resolving unicast flooding in a layer 2 broadcast domain, the method performed in a detector having a medium access control (MAC) address and connected to a port of a switch within the layer 2 broadcast domain, the method comprising:
   receiving a first flooded packet having a destination MAC address that is different from the MAC address of the detector;
   determining a type of a destination node for said first flooded packet based on whether a destination MAC address for said packet is a virtual router redundancy protocol (VRRP) MAC address or whether a destination Internet protocol (IP) address for said packet is an address within the layer 2 broadcast domain if the destination MAC address is not a VRRP MAC address; and,
   sending a message to a node in the layer 2 broadcast domain, wherein the message is adapted based on said type to trigger the node to announce its MAC address within the layer 2 broadcast domain, thereby causing the unicast flooding to be resolved.

2. The method according to claim 1, wherein, when the destination MAC address of the first flooded packet is a VRRP MAC address, sending the message to the node comprises sending the message to the VRRP MAC address.

3. The method according to claim 1, wherein, when the destination MAC address of the first flooded packet is other than a VRRP MAC address, and when the destination IP address is an address within the layer 2 broadcast domain, sending the message to the node comprises sending the message with an unused IP address as a source address, which message is to be responded to by the node.

4. The method recited in claim 3, wherein said node is a host, said message adapted to cause said host to make a broadcast address resolution towards said unused IP address, whereby said host announces its MAC address on the layer 2 broadcast domain.

5. The method according to claim 1, wherein, when the destination MAC address of the first flooded packet is other than a VRRP MAC address, and when the destination IP address is an address outside the layer 2 broadcast domain, sending the message to the node comprises sending an IP packet towards an IP address that is unused in the layer 2 broadcast domain.

6. The method recited in claim 5, wherein said node is a router, said message adapted to cause said router to make a broadcast address resolution towards said unused IP address, whereby said router announces its MAC address on the layer 2 broadcast domain.

7. A detector capable of resolving unicast flooding in a layer 2 broadcast domain, the detector having a medium access control (MAC) address and adapted to be connected to a port of a switch within the layer 2 broadcast domain, the detector comprising:
  an interface to receive a first flooded packet having a destination MAC address; and,
  a processing circuit adapted to, when the destination MAC address of the first flooded packet is different from the MAC address of the detector, 1) determine a type of a destination node for said first flooded packet based on whether the destination MAC address of the first flooded packet is a virtual router redundancy protocol (VRRP) MAC address or whether a destination Internet protocol (IP) address of the first flooded packet is an address within the layer 2 broadcast domain if the destination MAC address is not a VRRP MAC address, and 2) to send, via said interface, a message to a node in the layer 2 broadcast domain, wherein the message is adapted based on said type to trigger the node to announce its MAC address within the layer 2 broadcast domain, thereby causing the unicast flooding to be resolved.

8. The detector according to claim 7, wherein, when the destination MAC address of the first flooded packet is a VRRP MAC address, sending the message to the node comprises sending the message to the VRRP MAC address.

9. The detector according to claim 7, wherein, when the destination MAC address of the first flooded packet is other than a VRRP MAC address, and when the destination IP address is an address within the layer 2 broadcast domain, the message is sent with an unused IP address as a source address, which message is to be responded to by the node.

10. The detector recited in claim 9, wherein said node is a host, said message adapted to cause said host to make a broadcast address resolution towards said unused IP address, whereby said host announces its MAC address on the layer 2 broadcast domain.

11. The detector according to claim 7, when the destination MAC address of the first flooded packet is other than the VRRP MAC address, and when the destination IP address is an address outside the layer 2 broadcast domain, said message is sent towards an IP address that is unused in the layer 2 broadcast domain.

12. The detector recited in claim 11, wherein said node is a router, said message adapted to cause said router to make a broadcast address resolution towards said unused IP address, whereby said router announces its MAC address on the layer 2 broadcast domain.

13. A computer program product comprising program code stored in a non-transitory computer readable medium, said program code, when executed by a processor, operative to cause a system to:
  receive a first flooded packet having a destination medium access control (MAC) address that is different from a MAC address of a detector coupled to said system;
  determine a type of a destination node for said first flooded packet based on whether a destination MAC address for said packet is a virtual router redundancy protocol (VRRP) MAC address or whether a destination Internet protocol (IP) address for said packet is an address within a layer 2 broadcast domain if the destination MAC address is not a VRRP MAC address; and,
  send a message to a node in the layer 2 broadcast domain, wherein the message is adapted based on said type to trigger the node to announce its MAC address within the layer 2 broadcast domain, thereby causing unicast flooding to be resolved.

14. The computer program product as recited in claim 13, wherein, when the destination MAC address of the first flooded packet is a VRRP MAC address, said message is sent to the VRRP MAC address.

15. The computer program product as recited in claim 13, wherein, when the destination MAC address of the first flooded packet is other than a VRRP MAC address and the destination IP address is an address within the layer 2 broadcast domain, said message is sent to the node with an unused IP address as a source address, which message is to be responded to by the node.

16. The computer program product recited in claim 15, wherein said node is a host, said message adapted to cause said host to make a broadcast address resolution towards said unused IP address, whereby said host announces its MAC address on the layer 2 broadcast domain.

17. The computer program product as recited in claim 13, wherein, when the destination MAC address of the first flooded packet is other than the VRRP MAC address and the destination IP address is an address outside the layer 2 broadcast domain, sending the message to the node comprises sending an IP packet towards an IP address that is unused in the layer 2 broadcast domain.

18. The computer program product recited in claim 17, wherein said node is a router, said message adapted to cause said router to make a broadcast address resolution towards said unused IP address, whereby said router announces its MAC address on the layer 2 broadcast domain.

* * * * *